US007665219B2

(12) United States Patent  (10) Patent No.: US 7,665,219 B2
Styles et al.  (45) Date of Patent: Feb. 23, 2010

(54) SIGNAL TRANSMISSION APPARATUS FOR A MEASUREMENT PROBE

(75) Inventors: John Styles, Bristol (GB); Martin Adrian Woollett, Bristol (GB); Tim Prestidge, Bath (GB)

(73) Assignee: Renishaw PLC, Wotton-under-Edge (GB)

( * ) Notice: Subject to any disclaimer, the term of this patent is extended or adjusted under 35 U.S.C. 154(b) by 22 days.

(21) Appl. No.: 11/990,685

(22) PCT Filed: Sep. 24, 2006

(86) PCT No.: PCT/GB2006/003251

§ 371 (c)(1),
(2), (4) Date: Feb. 20, 2008

(87) PCT Pub. No.: WO2007/028964

PCT Pub. Date: Mar. 15, 2007

(65) Prior Publication Data

US 2009/0049704 A1  Feb. 26, 2009

(30) Foreign Application Priority Data

Sep. 6, 2005 (GB) ................... 0518078.1

(51) Int. Cl.
*G01B 5/008* (2006.01)
*G01B 7/012* (2006.01)
(52) U.S. Cl. .................. 33/503; 33/560; 702/168
(58) Field of Classification Search .......... 33/503, 33/552, 556, 557, 559, 560; 702/155, 167, 702/168
See application file for complete search history.

(56) References Cited

U.S. PATENT DOCUMENTS

| 4,658,509 | A | * | 4/1987 | Juengel | 33/558 |
| 5,056,235 | A | * | 10/1991 | Thomas | 33/503 |
| 5,150,529 | A | * | 9/1992 | Collingwood | 33/503 |
| 5,778,550 | A | * | 7/1998 | Carli et al. | 33/503 |
| 5,918,378 | A | * | 7/1999 | McMurtry et al. | 33/556 |
| 6,012,230 | A | * | 1/2000 | McMurtry et al. | 33/559 |
| 6,301,796 | B1 | * | 10/2001 | Cresson | 33/556 |
| 6,922,904 | B2 | * | 8/2005 | Groell et al. | 33/558 |
| 7,367,133 | B2 | * | 5/2008 | Hagl et al. | 33/503 |
| 2001/0034948 | A1 | * | 11/2001 | Matsumiya et al. | 33/553 |
| 2004/0134085 | A1 | * | 7/2004 | Fuge | 33/556 |
| 2009/0028286 | A1 | * | 1/2009 | Prestidge et al. | 33/559 |

FOREIGN PATENT DOCUMENTS

| WO | WO 99/47884 A1 | 9/1999 |
| WO | WO 02/063235 A2 | 8/2002 |
| WO | WO 03/002296 A1 | 1/2003 |
| WO | WO 2004/057552 A1 | 7/2004 |

* cited by examiner

*Primary Examiner*—G. Bradley Bennett
(74) *Attorney, Agent, or Firm*—Oliff & Berridge, PLC

(57) ABSTRACT

A measurement probe (12, 110, 250), such as a touch trigger or analogue probe, is described that comprises a deflectable stylus portion (14) and a wireless communications unit (18) for transmitting stylus deflection data to a remote probe interface (20, 104, 254). The wireless communications unit (18) is arranged to transmit digital data packets comprising stylus deflection data and a probe identity code. The wireless communications unit (18) allows said probe identity code to be set by a user. The measurement probe (12, 110, 250) may communicate with an associated probe interface (20, 104, 254) over a radio frequency (RF) spread spectrum link (106).

24 Claims, 4 Drawing Sheets

SIGNAL TRANSMISSION APPARATUS FOR A MEASUREMENT PROBE

The present invention relates to measurement probes for use with co-ordinate measuring devices such as coordinate measuring machines (CMMs), machine tools, manual coordinate measuring arms and inspection robots. In particular, the present invention relates to wireless transmission apparatus for such measurement probes.

Co-ordinate measuring devices are often equipped with a measurement device, for example touch trigger probe, which establishes the geometry of a workpiece or other object during a measurement process by delivering a trigger signal when it comes into contact with a surface. The measurement probe has a stylus which deflects on contact with the surface and causes the production of the trigger signal. This trigger signal is used to freeze the outputs of scales or other measuring means which indicate the position of the probe and thus the surface.

In certain circumstances, for example when it is difficult to wire a probe directly to a machine controller, a wireless transmission system is used to communicate the probe signals to the machine controller usually via an interface. Problems can arise if there is more than one system in an environment due to interference between the systems. Traditionally, this was solved by using a fixed frequency band system with each probe-interface pair being set to a different frequency. In the event that an alternative probe or interface needed to be used, it merely had to be set to the same fixed frequency band. However, when the transmission system is set to a fixed frequency band interference from other sources, such as walkie talkies in the case of radio transmission systems, is a problem as it results in lost data.

One solution to the above described interference problem is to use a spread spectrum radio link, such as a frequency hopping link, where the probe and interface switch channels in a synchronised sequence. Examples of such a system are given in WO2004/057552 (Renishaw plc). In order for such a link to be established whilst allowing real time data transfer between the probe and interface, the probe and interface are paired together exclusively. This pairing is achieved by assigning each measurement probe a unique identity code during probe manufacture. This unique ID code is included with each packet of digital data that is transmitted by the probe. An initial "pairing" procedure is performed by the user in which an interface learns the unique identity code of the probe that is to be used therewith. Once paired, the interface will only process communications that contain the unique identity code of the paired probe. This prevents a probe and interface from receiving communications from any other interface or probe thereby allowing multiple interface/probe pairs to be operated in close proximity.

Although the system described in WO2004/057552 allows reliable communications to be established between a single probe and interface, it does have disadvantages. Most notably, the apparatus of WO2004/057552 requires the "pairing" procedure to be performed by a user each time it is required to use a different probe with a given interface. This can be quite inconvenient where a number of different probes are used non-concurrently with a single interface to enable, for example, measurement of different types of feature.

According to a first aspect of the present invention, a measurement probe comprises a deflectable stylus portion and a wireless communications unit for transmitting stylus deflection data to a remote probe interface, wherein said wireless communications unit is arranged to transmit digital data packets comprising stylus deflection data and a probe identity code, characterised in that said wireless communications unit allows said probe identity code to be set by a user.

The present invention thus provides a measurement probe, for example a touch trigger probe or analogue probe, that includes a wireless (e.g. spread spectrum) communications unit for transmitting stylus deflection data (e.g. data relating to trigger events) in the form of digital data packets to a remote probe interface. To allow only the required digital data packets to be read by the associated probe interface, each data packet includes a probe identity (ID) code. The wireless communications unit allows a user to set the probe identity code that is included in the transmitted data packets. As described in more detail below, the user may, for example, set the probe identity code by selecting the probe ID code from a number of pre-programmed special identity codes (IDs) and/or by loading a clone identity code (IDc) into the measurement probe from the remote probe interface.

A probe of the present invention has a number of advantages over prior art probes of the type described in WO2004/057552 that have a single factory set (i.e. fixed) probe ID code. In particular, the present invention allows a plurality of measurement probes to be used, non-concurrently, with a single probe interface whilst ensuring there is still no interference with other interface and probe systems located in the vicinity.

The present invention thus permits a co-ordinate measuring device (e.g. a machine tool) to be fitted with a single probe interface and multiple measurement probes. The different measurement probes may, for example, have styli of different lengths or configurations that are selected for probing different workpieces or different features of a workpiece. Each of these measurement probes may be stored in a tool changer device and the required measurement probe can then be loaded into the machine spindle when it is wished to take measurements using that probe. The user can thus set all the measurement probes associated with the machine to transmit data packets that include the same probe identity code thereby allowing the probe interface to read data packets originating from any of the measurement probes. Unlike prior art systems, this allows (non-concurrent) use of any of the probes without having to perform a "pairing" operation each time data from a different probe is to be collected by the interface.

Advantageously, the wireless communications unit can be placed in a receive mode in which at least one clone identity code can be acquired from a remote probe interface. This allows a pairing operation to be performed in which one or more probe ID codes are loaded into the measurement probe from the probe interface. The clone ID code may be an identity code that is permanently programmed into the probe interface or has been loaded into that interface from another measurement probe. For example, the clone ID code may be a copy of the unique identity code of another measurement probe.

The measurement probe may conveniently be arranged so that the user can select at least one clone identity code for transmission as the probe identity code. For example, it may be possible to toggle the probe identity code (i.e. the code transmitted with each data packet) between the clone identity code(s) and any other identity codes stored by the probe.

The wireless communications unit may advantageously store one unique identity code, or more than one unique identity code. Preferably, the user can then select whether said unique identity code is to be transmitted as said probe identity code. In such an arrangement, the measurement probe may conveniently be toggled between a "master" mode in which the probe identity code is the unique identity code and a "clone" mode in which a stored clone identity code is output as the probe identity probe.

The wireless communications unit may conveniently store a plurality of special identity codes and the user may be able to set the wireless communications unit to output any one of the plurality of special identity codes as said probe identity code. These special identity codes may be in addition to any other codes (e.g. clone or unique identity codes) that may also be stored by the wireless communications unit of the measurement probe.

Preferably, the wireless communications unit stores at least two, at least five, or at least ten special identity codes. More preferably, the wireless communications unit stores sixteen special identity codes. These special identity codes (IDs) may be standard across a product range. For example, a set of sixteen IDs codes may be used as standard for a range of measurement probe and interface products.

The interface intended for use with such measurement probes may also be pre-programmed with the same special identity (IDs) codes such that no pairing procedure is required during system set-up. The end user, or even the supplier, can then pre-set the measurement probes and the interface to the same identity codes prior to installation on the co-ordinate measuring device.

If the measurement probe can store more than one identity code at a time (e.g. if it stores a combination of unique, clone and/or special identity codes), it may arranged to include selection means for switching between the different identity codes. The probe thus advantageously comprises integral selection means (e.g. a probe mounted switch or sensor) that allow a user to select the identity code that is to be transmitted as said probe identity code. Providing such an integral selection means negates the need to establish any kind of communications link to the probe to set the probe identity code.

Conveniently, the integral selection means comprises the deflectable stylus portion. The probe may thus include the Trigger Logic system described in EP1373995 (Renishaw plc). In other words, the probe may be arranged to enter a programmable mode (e.g. on battery insertion) in which manual deflection (triggering) of the stylus can be used to select the required probe identity code and/or place the probe in a receive mode for receiving a clone identity code.

Preferably, the probe also comprises means to communicate information to a user about the probe identity code that is to be transmitted as part of said digital data packet. For example, the probe may comprise one or more light emitting diodes (LEDs). These LEDs may be different colours and may be arranged to flash in a sequence that identifies the selected probe identity code; e.g. the LEDs may flash a code sequence that indicates which special identity code (e.g. IDs1 to IDs16) has been set.

Advantageously, the wireless communications unit of the measurement probe operates (i.e. transmits and/or receives) at radio frequencies (RF). Preferably, the wireless communications unit provides a (half duplex) spread spectrum radio link between said measurement probe and a remote interface. Conveniently, the spread spectrum radio link comprises at least one of a frequency hopping link and a direct sequencing link. Alternatively, the wireless communications unit may operate at non-RF frequencies; e.g. at optical (including infra-red or ultra-violet) wavelengths.

As described above the data packets transmitted by the wireless communications unit comprise stylus deflection data and a probe identity code. The data packets may also include additional data; for example at least one of timing data (e.g. to time stamp trigger events) and battery status data.

The measurement probe may conveniently be a touch trigger probe. The deflectable stylus portion may then comprise a touch trigger mechanism and the stylus deflection data may comprise trigger status (e.g. triggered or seated) data.

Alternatively, the measurement probe may be a analogue or scanning probe. In an analogue probe, the deflectable stylus portion may comprises means (e.g. one or more strain gauges) for measuring stylus deflection and said stylus deflection data may comprise information relating to the amount of stylus deflection.

The measurement probe may have a stylus portion that comprises a stylus holder for retaining a detachable stylus. In other words, the stylus may be releasable attachable to the main body of the measurement probe and may be sold separately to the measurement probe itself. Alternatively, the stylus portion may comprise a workpiece contacting stylus permanently affixed to the probe.

As noted above, multiple measurement probes of the present invention may be used with a probe interface. In such an arrangement, it is preferred that no more than one measurement probe transmits data at any one time (i.e. the probes preferably transmit data packets non-concurrently). In order to ensure that only the required probe is switched on at any one time, the probe advantageously comprises an activation device for automatically switching the probe "on" and "off" as required, wherein the activation device is separate to the wireless communications unit. The activation device may comprise a shank switch or spin switch such that the measurement probe is only switched on when it is mounted in, or rotated by, the machine tool spindle. This ensures that only one probe is ever actively transmitting data packets at any one time.

According to a second aspect of the invention, a probe interface for receiving stylus deflection data from one or more measurement probes is provided, each of said one or more measurement probes being arranged to transmit data packets comprising a probe identity code, characterised in that said interface is configured to store a plurality of identity codes. Preferably, the interface only reads data packets that comprise a probe identity code that matches a stored identity code.

Unlike prior art probe interfaces in which only a single identity code can be stored, the probe interface of the present invention can store a plurality of identity codes. Providing such an interface is advantageous, although by no means essential, when a plurality of measurement probes (such as those described above) are to be used with the interface.

Advantageously, the interface may be pre-programmed or factory set to store one or more special identity codes. These special identity codes may correspond to the special identity codes stored by one or more associated measurement probes. The interface may also comprise means for receiving, and storing, a probe identity code from a measurement probe.

Conveniently, the interface is arranged to non-concurrently receive data from a plurality of measurement probes, wherein said interface is configured to only read data packets that include a probe identity code that corresponds to one or more of the identity codes that are stored by the interface.

For example, the probe interface may be arranged to read data packets that include a selected one of the stored identity codes. Alternatively, the probe interface may be arranged to read data packets that include any, or any sub-set, of the plurality of stored identity codes.

In a preferred embodiment, the interface may be configured to store a plurality of identity codes and to read data packets that include a probe identity code that corresponds to any one of said plurality of stored identity codes. In this manner, the probe interface can be paired with, and non-concurrently read data from, more than one measurement probe. The measurement probes associated with the interface may transmit data packets having the same, or different, probe identity codes; e.g. the interface may be used with probes according to the first aspect of the invention and/or probes having a factory set probe identity code of the type described previously in WO2004/057552.

One or more of the identity codes stored by the interface may conveniently be loaded into an associated measurement probe. The interface may thus comprise means for transmitting an identity code to an associated measurement probe; for example, the interface may transmit and identity code to a measurement probe according to the first aspect of the invention that is operating in "clone" mode.

Advantageously, the probe interface operates (i.e. transmits and/or receives) at radio frequencies (RF). Preferably, the interface communicates with associated measurement probes by a (half duplex) spread spectrum radio link. Conveniently, the spread spectrum radio link comprises at least one of a frequency hopping link and a direct sequencing link. Alternatively, the wireless communications unit may operate at non-RF frequencies; e.g. at optical (including infra-red or ultra-violet) wavelengths. The interface may also have a (e.g. hard-wired) link for communicating with a control computer.

A plurality of such probe interfaces may also be conveniently used in combination to read data from one or more measurement probes.

According to a third aspect of the invention, a kit for a co-ordinate positioning machine comprises at least one measurement probe according to the first aspect of the invention and at least one probe interface for receiving stylus deflection data from said at least one measurement probe. The kit may be supplied with, or retrofitted to, a co-ordinate measuring device such as a machine tool.

Advantageously, the kit comprises a plurality of measurement probes, wherein each measurement probe is configured to output data packets having the same probe identity code. For example, each measurement probe may be set to output data packets including the same special identity code.

The at least one probe interface of the kit may be arranged to only read data that contains a certain probe identity code or codes; e.g. the probe interface may only recognise the probe identity code(s) that are output by the at least one measurement probe of the kit. The probe interface may store one or more predefined probe identity codes (e.g. it may store one or more special identity codes of the type described above) and/or it may be arranged to receive and store probe identity code(s) received from the at least one measurement probe of the kit.

The kit may advantageously comprise a plurality of probe interfaces, each of which can be placed at a different location on a co-ordinate measuring device, for receiving stylus deflection data from said at least one measurement probe. Providing multiple probe interfaces allows data to be read from the at least one measurement probe as it is moved to different parts of the machine. This is especially advantageous when the kit is mounted on large co-ordinate measuring devices in which the signal path between the measurement probe and a particular interface can be obstructed by other parts of the machine. When multiple probe interfaces are employed, the probe data used for measurement purposes may be collected via the probe interface that receives the strongest, or best quality, signal from the active measurement probe. Alternatively, probe data from more than one interface may be combined.

If the kit comprises a single measurement probe and a plurality of probe interfaces, each probe interface may be arranged to read only data packets that include the probe identity code of that single measurement probe. If the kit comprises a plurality of measurement probes, each measurement probe may advantageously be configured to output data packets having the same probe identity code. If in range, each probe interface can then read data packets from any one of the plurality of measurement probes. The kit can thus provide measurement apparatus in which one or multiple probe interfaces can receive data from a single probe or (non-concurrently) from multiple probes.

Advantageously, the at least one probe interface of the kit comprises a probe interface according to the second aspect of the invention. Alternatively, a probe interface of known type may be provided.

The invention also extends to a co-ordinate measuring device incorporating a measurement probe, interface or kit of the type described above.

According to a fourth aspect of the invention, a method of using an measurement probe comprises the step (i) of taking a measurement probe comprising a deflectable stylus portion and a wireless communications unit for transmitting stylus deflection data to a remote probe interface, wherein said wireless communications unit is arranged to transmit, in use, digital data packets comprising stylus deflection data and a probe identity code characterised by the method comprising the step (ii) of setting the probe identity code. Step (ii) may include selecting a probe ID code from any one of a plurality of special identity codes and/or receiving a clone identity code from a probe interface.

According to a fifth aspect of the invention, measurement apparatus comprises at least one probe interface and a plurality of measurement probes, wherein said measurement probes are arranged to non-concurrently transmit digital data packets to the probe interface, said digital data packets comprising stylus deflection data and a probe identity code, wherein each of the plurality of measurement probes is configured, in use, to output data packets including the same probe identity code. The probe interface and measurement probes may communicate via a spread spectrum radio link. A plurality of probe interfaces may advantageously be provided to receive the digital data packets.

According to a sixth aspect of the invention, measurement apparatus comprises a plurality of probe interfaces and at least one measurement probe, wherein said at least one measurement probe is arranged to transmit digital data packets to the plurality of probe interfaces, said digital data packets comprising stylus deflection data and a probe identity code, wherein each of the plurality of probe interfaces is configured, in use, to read data packets containing said probe identity code. The apparatus may advantageously comprise a plurality of measurement probes.

The invention will now be described by example, with reference to the accompanying drawings, of which:

Figure 1:
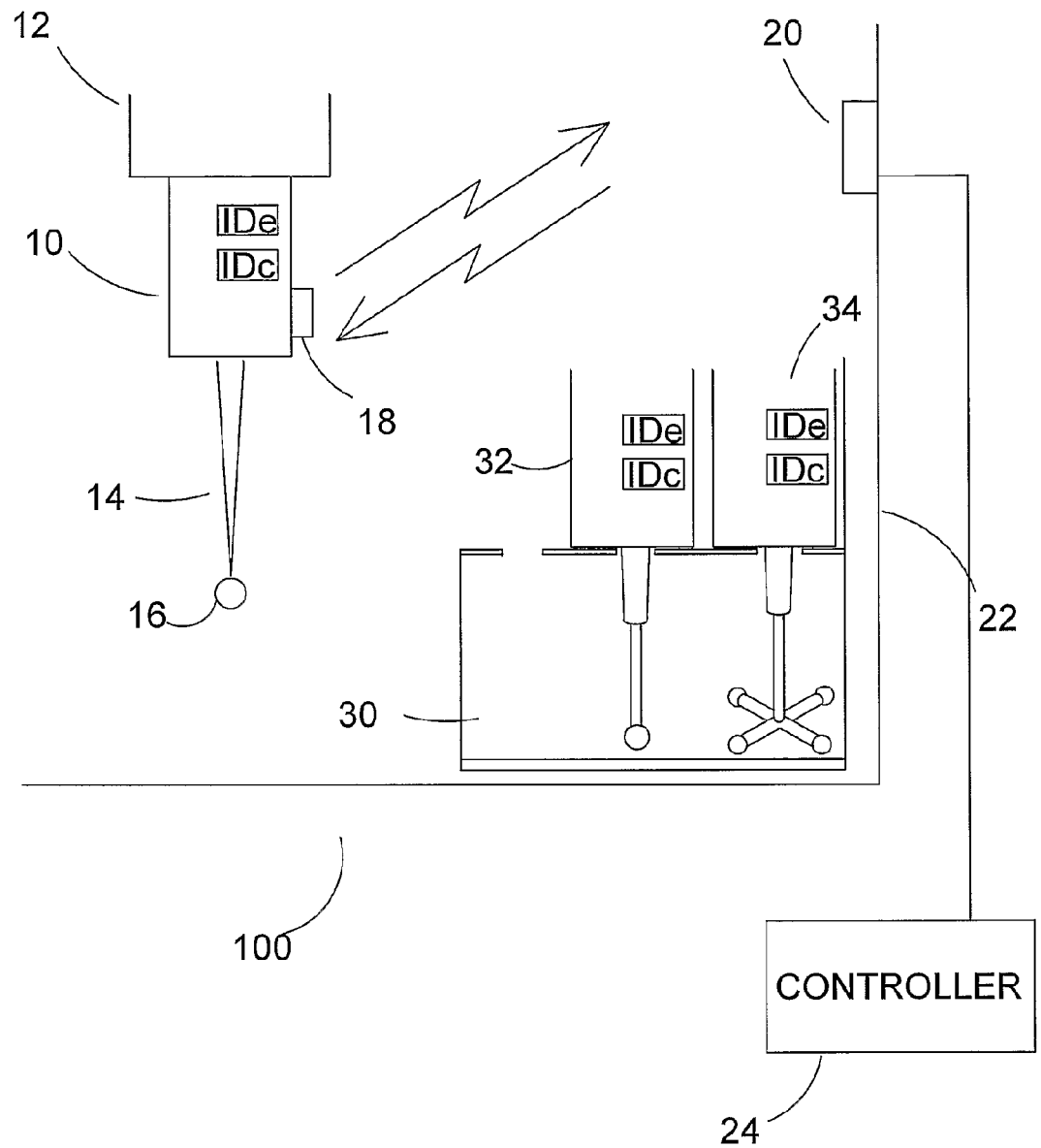
FIG. 1 shows schematically a coordinate measuring device according to the invention.

FIG. 1 shows a coordinate measuring device 100 having a measuring probe 10 which is connected at one end to the device 100 via a spindle or quill 12 and, at the distal end to a deflectable stylus 14 having a tip 16. The signal transmission system comprises two parts, the probe station or wireless communications unit 18 is connected to the probe 10 and the machine station or interface 20 is mounted on a stationary part of the machine 22 and connected to a machine controller 24.

Data is transmitted between the probe station 18 and the machine station 20 using a spread spectrum link, in this case a frequency hopping radio communications link, which sends the data in a known form such as discrete packages of serial binary data.

The machine 100 is provided with two further probes 32, 34 mounted in a holder 30. The two further probes 32, 34 can be exchanged for the currently used probe 10 by disconnecting the joint between the probe 10 and the spindle 12 and either manually or automatically exchanging the probes in a manner known in the art.

The machine station 20 and a first or master probe (in this example probe 10) are paired together by the station 20 sending a handshake communication which the probe 10 responds to by providing its exclusive identity code—IDe. This IDe is stored in the machine station 20 and, in current systems, the station only responds to a probe having that identity code. In order to communicate with the probe, the machine station scans through each of the available channels looking for the IDe and if found, it accepts data that is transmitted with that IDe. This is explained in more detail in International Patent Application No. WO2004/057552 which is hereby incorporated by reference.

In order to enable the machine station 20 to communicate with different probes, in this embodiment, the probes 32, 34 are provided with two identity fields. The first field IDe is the exclusive identity code which is assigned to the probe when manufactured. The second field IDc is a clone identity field, which is initially empty. As the machine 100 can only use one probe at a time, a first probe can be exchanged for a second probe by cloning that second probe so it appears to be the first or master probe to the machine station. This is achieved by setting alternative probes 32, 34 into 'clone mode' so that when they are first introduced to the paired machine station 20 instead of giving their IDe to the station, they accept the identity stored in the station into their IDc field. Once the probes 32, 34 are cloned or slaved to the master probe 10, they can all be exchanged and used with the station.

If, for some reason, it is desired to use one of the clone probes with a different station, it can either be switched from clone mode into exclusive mode and paired with a new station or, the clone identity can be wiped from the memory and a new IDc entered as described above.

Figure 2:
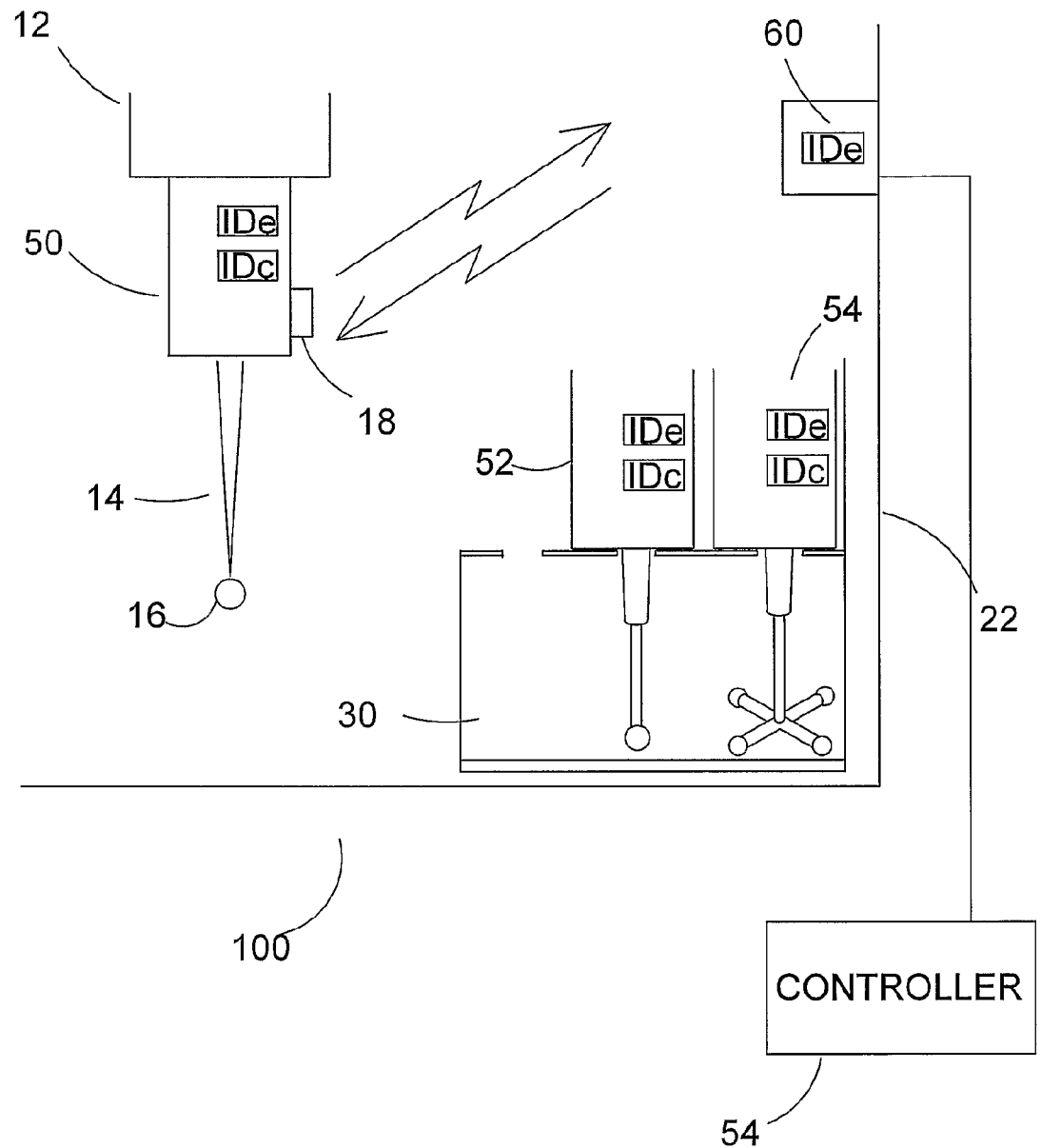
FIG. 2 shows schematically an alternative embodiment of the invention.

In an alternative embodiment, instead of a master probe providing an IDe which is cloned, the interface or machine controller provides it. Referring now to FIG. 2, when the first probe 50 and the machine station 60 are paired together, the machine station 60 sends it's IDe to the first probe 50 and this identity code is stored in the clone identity field (IDc) of the first probe 50. This procedure is repeated for further probes 52, 54. In this embodiment all the probes 50, 52, 54 are in 'clone mode'.

Figure 3:
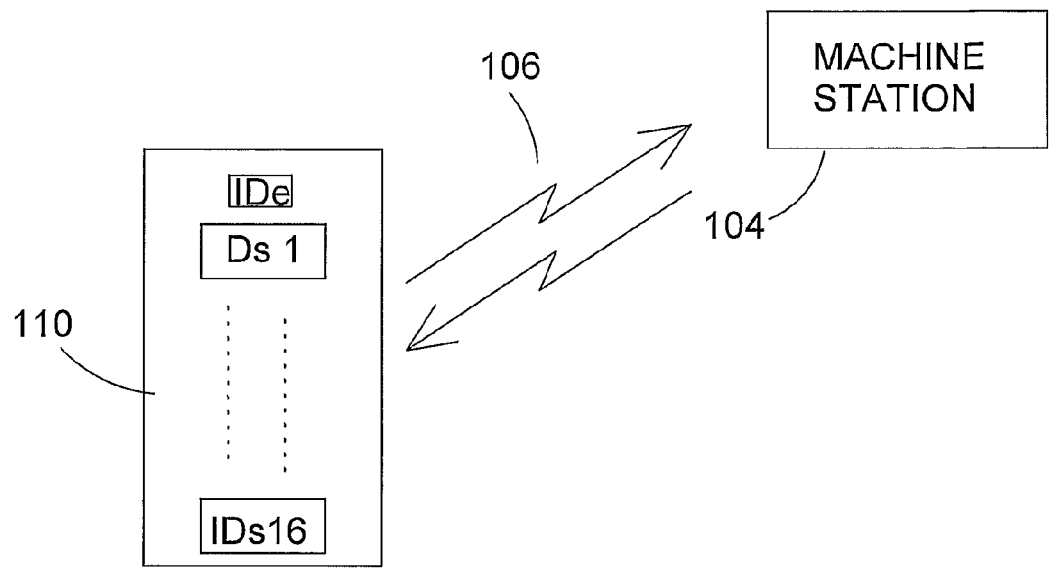
FIG. 3 shows a further embodiment of the invention.

FIG. 3 shows a machine station 104 which communicates with a probe 110 via a wireless transmission link 106. The probe 110 is provided with a unique identity (IDe) and sixteen special identity codes, IDs1 to IDs16. Instead of having a master and cloned probes, each probe which will be used with a particular machine station is set to the same IDs. A first probe is paired with the machine station in the normal manner and the machine station stores the selected IDs. The machine station will communicate with any other probe set to that IDs.

If there is more than one set of interface and probes in a machine environment, they can each be set to a different IDs to prevent cross-talking.

Figure 4:
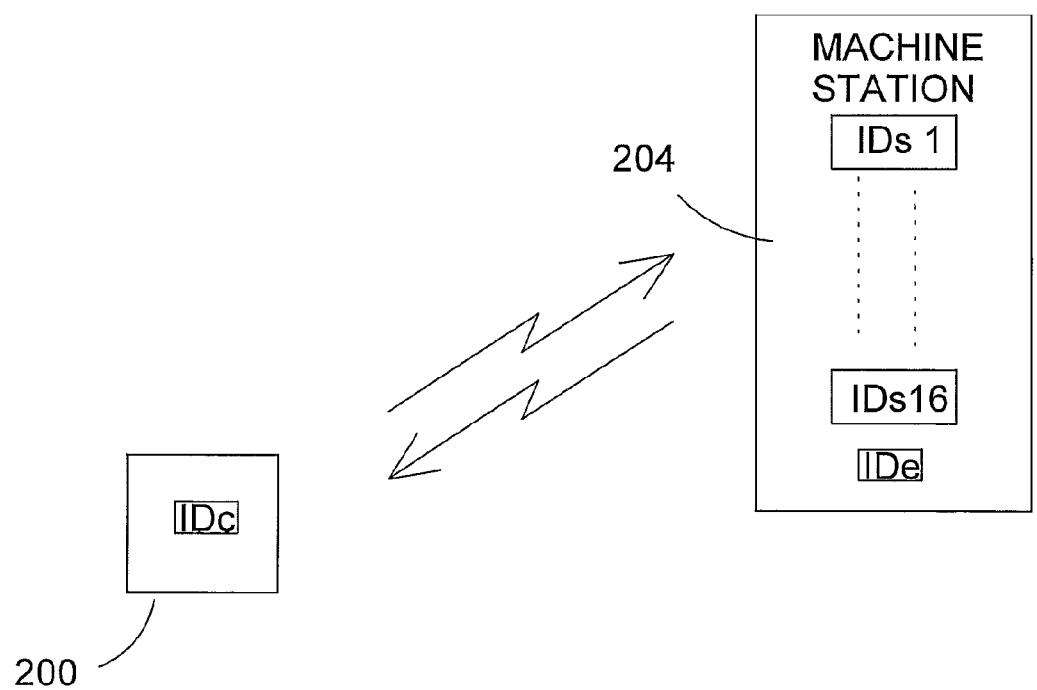
FIG. 4 shows an embodiment of the invention.

FIG. 4 shows another embodiment whereby the machine station 204 is allocated an exclusive code IDe and also a set of special identity codes IDs. In this example, the machine station 204 and the probe 200 are paired together by the probe 200 sending a handshake communication which the machine station 204 responds to by providing either its IDe or if selected, one of its set of IDs codes. This ID is stored in the probe 200 in a clone identity field IDc to pair the two together. Further probes can be paired to the same machine station in the same way, and if necessary additional machine stations can be set to use the same special codes identities.

Figure 5:
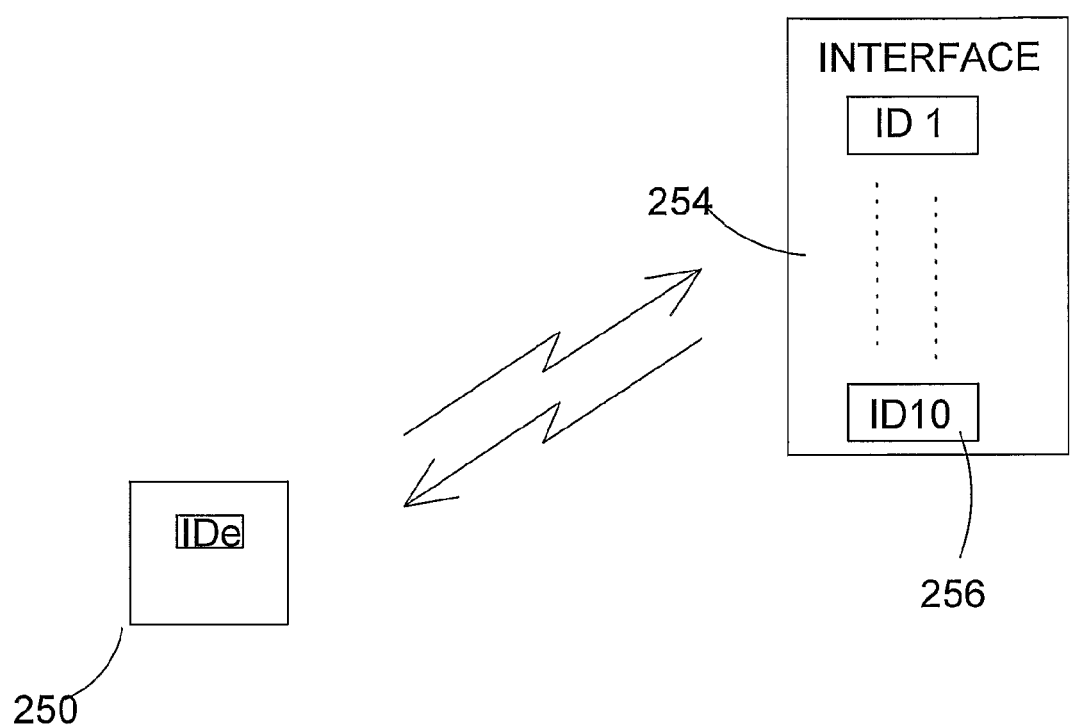
FIG. 5 shows an alternative embodiment of the invention.

FIG. 5 shows yet a further embodiment of the invention. In this embodiment, the interface 254 is provided with a buffer 256 in which a number of different probe identity codes can be stored, for example ten (ID 1 to ID 10). When the interface pairs with a probe the IDe of that probe 250 is stored in the next free field of the buffer 256. In the event that the buffer is full, the oldest or first input code is overwritten. When the interface attempts to communicate with a probe in this embodiment, the interface scans through each of the available channels for each identity that is stored in turn.

For the situation where there are both a number of interfaces or stations and a number of probes being used, for example on large measuring machines, the simplest mode of operation, is to have each machine controller and probe assigned the same identity code, whether it is an exclusive, special or cloned code.

In all cases the minimum necessary condition is that all probes know the identity code of all machine stations, or all machine stations know the identity code of all probes.

Although the invention has been described using a frequency hopping spread spectrum link, other spread spectrum systems, for example direct sequence can be used. The communications link need not be radio, transmissions via other frequencies can be used alternatively.

The specific examples given use touch trigger probes, however, the invention is equally applicable to analogue probes, scanning probes and other sensors which are used with measuring machines for example, ball bars. In the examples given, the machine station or interface and machine controller have been shown as separate articles but, in practice, these two can be combined.

The invention claimed is:

1. A measurement probe comprising a deflectable stylus portion and a wireless communications unit for transmitting stylus deflection data to a remote probe interface, wherein said wireless communications unit is arranged to transmit digital data packets comprising stylus deflection data and a probe identity code, wherein said wireless communications unit allows said probe identity code to be set by a user.

2. A measurement probe according to claim 1 wherein the wireless communications unit can be placed in a receive mode in which at least one clone identity code can be acquired from a remote probe interface.

3. A measurement probe according to claim 2 wherein the user can select at least one clone identity code for transmission as said probe identity code.

4. A measurement probe according to claim 1 wherein the wireless communications unit stores a unique identity code, wherein the user can select whether said unique identity code is to be transmitted as said probe identity code.

5. A measurement probe according to claim 1 wherein said wireless communications unit stores a plurality of special identity codes, wherein the user can select any one of said special identity codes for transmission as said probe identity code.

6. A measurement probe according to claim 5 wherein the wireless communications unit stores at least ten special identity codes.

7. A measurement probe according to claim 6 wherein the wireless communications unit stores sixteen special identity codes.

8. A measurement probe according to claim 3 comprising integral selection means that allow a user to select the identity code that is to be transmitted as said probe identity code.

9. A measurement probe according to claim 8 wherein the integral selection means comprises the deflectable stylus portion.

10. A measurement probe according to claim 1 comprising means to communicate information to a user about the probe identity code that is to be transmitted as part of said digital data packet.

11. A measurement probe according to claim 10 wherein the means to communicate information comprises at least one light emitting diode.

12. A measurement probe according to claim 1 wherein the wireless communications unit operates at radio frequencies.

13. A measurement probe according to claim 12 wherein the wireless communications unit provides a spread spectrum radio link between said measurement probe and a remote interface.

14. A measurement probe according to claim 13 wherein the spread spectrum radio link comprises at least one of a frequency hopping link and a direct sequencing link.

15. A measurement probe according to claim 1 wherein said digital data packets comprise additional data, said additional data comprising at least one of timing data and battery status data.

16. A measurement probe according to claim 1 that comprises a touch trigger probe.

17. A measurement probe according to claim 1 that comprises an analogue probe.

18. A measurement probe according to claim 1 wherein the stylus portion comprises a stylus holder for retaining a detachable stylus.

19. A measurement probe according to claim 1 comprising an activation device for automatically switching the probe "on" and "off" as required, wherein said activation device is separate to the wireless communications unit.

20. A kit for a co-ordinate positioning machine comprising at least one measurement probe according to claim 1 and at least one probe interface for receiving stylus deflection data from said at least one measurement probe.

21. A kit according to claim 20 comprising a plurality of measurement probes, wherein each measurement probe is configured to output data packets having the same probe identity code.

22. A kit according to claim 20 comprising a plurality of probe interfaces.

23. A kit according to claim 20 wherein said at least one probe interface comprises at least one probe interface for receiving stylus deflection data from one or more measurement probes, each of said one or more measurement probes being arranged to transmit data packets comprising a probe identity code, wherein said at least one probe interface is configured to store a plurality of identity codes.

24. A co-ordinate positioning machine incorporating at least one of a measurement probe according to claim 1, an interface for receiving stylus deflection data from said at least one of the measurement probe, each of said at least one of the measurement probe being arranged to transmit data packets comprising a probe identity code, wherein said interface is configured to store a plurality of identity codes, and a kit for a co-ordinate positioning machine that includes said at least one of the measurement probe and said interface for receiving stylus deflection data from said at least one of the measurement probe.

* * * * *